US010402315B1

(12) United States Patent
Fenol et al.

(10) Patent No.: US 10,402,315 B1
(45) Date of Patent: *Sep. 3, 2019

(54) DATA STORAGE SYSTEM CONFIGURED TO WRITE VOLATILE SCATTERED MEMORY METADATA TO A NON-VOLATILE MEMORY

(71) Applicant: BiTMICRO Networks, Inc., Fremont, CA (US)

(72) Inventors: Marvin Dela Cruz Fenol, Manila (PH); Jik-Jik Oyong Abad, Pasay (PH); Precious Nezaiah Umali Pestano, Quezon (PH)

(73) Assignee: BiTMICRO Networks, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,840

(22) Filed: Nov. 6, 2017

Related U.S. Application Data

(63) Continuation of application No. 14/690,370, filed on Apr. 17, 2015, now Pat. No. 9,811,461.

(60) Provisional application No. 61/981,165, filed on Apr. 17, 2014, provisional application No. 61/981,150, filed on Apr. 17, 2014, provisional application No. 61/980,634, filed on Apr. 17, 2014, provisional application No. 61/980,594, filed on Apr. 17, 2014.

(51) Int. Cl.
*G06F 12/02* (2006.01)
*G06F 12/0831* (2016.01)

(52) U.S. Cl.
CPC ...... *G06F 12/0246* (2013.01); *G06F 12/0833* (2013.01); *G06F 2212/62* (2013.01); *G06F 2212/7201* (2013.01)

(58) Field of Classification Search
CPC ............. G06F 12/0246; G06F 12/0833; G06F 2212/62; G06F 2212/7201
See application file for complete search history.

(56) References Cited

U.S. PATENT DOCUMENTS

2011/0208914 A1* 8/2011 Winokur ............. G06F 11/1441 711/119

* cited by examiner

*Primary Examiner* — Eric Cardwell
(74) *Attorney, Agent, or Firm* — Adams Intellex, PLC

(57) ABSTRACT

In an embodiment of the invention, a method comprises: requesting an update or modification on a control data in at least one flash block in a storage memory; requesting a cache memory; replicating, from the storage memory to the cache memory, the control data to be updated or to be modified; moving a clean cache link list to a dirty cache link list so that the dirty cache link list is changed to reflect the update or modification on the control data; and moving the dirty cache link list to a for flush link list and writing an updated control data from the for flush link list to a free flash page in the storage memory.

24 Claims, 10 Drawing Sheets

DATA STORAGE SYSTEM CONFIGURED TO WRITE VOLATILE SCATTERED MEMORY METADATA TO A NON-VOLATILE MEMORY

CROSS-REFERENCE(S) TO RELATED APPLICATIONS

This application is a continuation application of U.S. application Ser. No. 14/690,370 which claims the benefit of and priority to U.S. Provisional Application 61/981,165, filed 17 Apr. 2014. This U.S. Provisional Application 61/981,165 is hereby fully incorporated herein by reference. U.S. application Ser. No. 14/690,370 is hereby fully incorporated herein by reference.

U.S. application Ser. No. 14/690,370 claims the benefit of and priority to U.S. Provisional Application 61/981,150, filed 17 Apr. 2014. This U.S. Provisional Application 61/981,150 is hereby fully incorporated herein by reference.

U.S. application Ser. No. 14/690,370 claims the benefit of and priority to U.S. Provisional Application 61/980,634, filed 17 Apr. 2014. This U.S. Provisional Application 61/980,634 is hereby fully incorporated herein by reference.

U.S. application Ser. No. 14/690,370 claims the benefit of and priority to U.S. Provisional Application 61/980,594, filed 17 Apr. 2014. This U.S. Provisional Application 61/980,594 is hereby fully incorporated herein by reference.

FIELD

Embodiments of the invention relate generally to data storage systems. Embodiments of the invention also relate to writing scattered cache memory data to a flash device. Embodiments of the invention also relate to writing volatile scattered memory metadata to a flash device.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

In a typical data storage system, a minimum size of cache memory is used to read or write a data. Where that size is large enough for a small change, this conventional approach does not maximize the write amplification. This type of write process in a permanent storage limits some certain types of control data. As known to those skilled in the art, write amplification is an undesirable phenomenon associated with flash memory and solid-state drives (SSDs) where the actual amount of physical information written is a multiple of the logical amount intended to be written.

Additionally, in a typical data storage system, the size used for the cache allocation is the same as the flash page size. By this approach, the data will transfer with difficulty.

Therefore, there is a continuing need to overcome the constraints or disadvantages of current conventional systems.

SUMMARY

Embodiments of the invention relate generally to data storage systems. Embodiments of the invention also relate to writing scattered cache memory data to a flash device. Embodiments of the invention also relate to writing volatile scattered memory metadata to a flash device.

In an embodiment of the invention, a method and apparatus will update the data by using a temporary storage and will transfer the modified data to a new location in a permanent storage. This design or feature is used for write purposes of control data from cache memory to storage memory. By using the cache memory as a temporary location for modifying data, the design maximizes the write amplification.

In an embodiment of the invention, a method comprises: requesting an update or modification on a control data in at least one flash block in a storage memory; requesting a cache memory; replicating, from the storage memory to the cache memory, the control data to be updated or to be modified; moving a clean cache link list to a dirty cache link list so that the dirty cache link list is changed to reflect the update or modification on the control data; and moving the dirty cache link list to a for flush link list and writing an updated control data from the for flush link list to a free flash page in the storage memory.

In another embodiment of the invention, an article of manufacture comprises: a non-transient computer-readable medium having stored thereon instructions that permit a method comprising: requesting an update or modification on a control data in at least one flash block in a storage memory; requesting a cache memory; replicating, from the storage memory to the cache memory, the control data to be updated or to be modified; moving a clean cache link list to a dirty cache link list so that the dirty cache link list is changed to reflect the update or modification on the control data; and moving the dirty cache link list to a for flush link list and writing an updated control data from the for flush link list to a free flash page in the storage memory.

In another embodiment of the invention, apparatus comprises: a control data flushing system configured to: request an update or modification on a control data in at least one flash block in a storage memory; request a cache memory; replicate, from the storage memory to the cache memory, the control data to be updated or to be modified; move a clean cache link list to a dirty cache link list so that the dirty cache link list is changed to reflect the update or modification on the control data; and move the dirty cache link list to a for flush link list and write an updated control data from the for flush link list to a free flash page in the storage memory.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms “a” and “an” herein do not denote a limitation of quantity, but rather denote the presence of at least one of the referenced items.

In the following description and in the claims, the terms “include” and “comprise” are used in an open-ended fashion, and thus should be interpreted to mean “include, but not limited to . . . ”. Also, the term “couple” (or “coupled”) is intended to mean either an indirect or direct electrical connection. Accordingly, if one device is coupled to another device, then that connection may be through a direct electrical connection, or through an indirect electrical connection via other devices and/or other connections.

Figure 1:
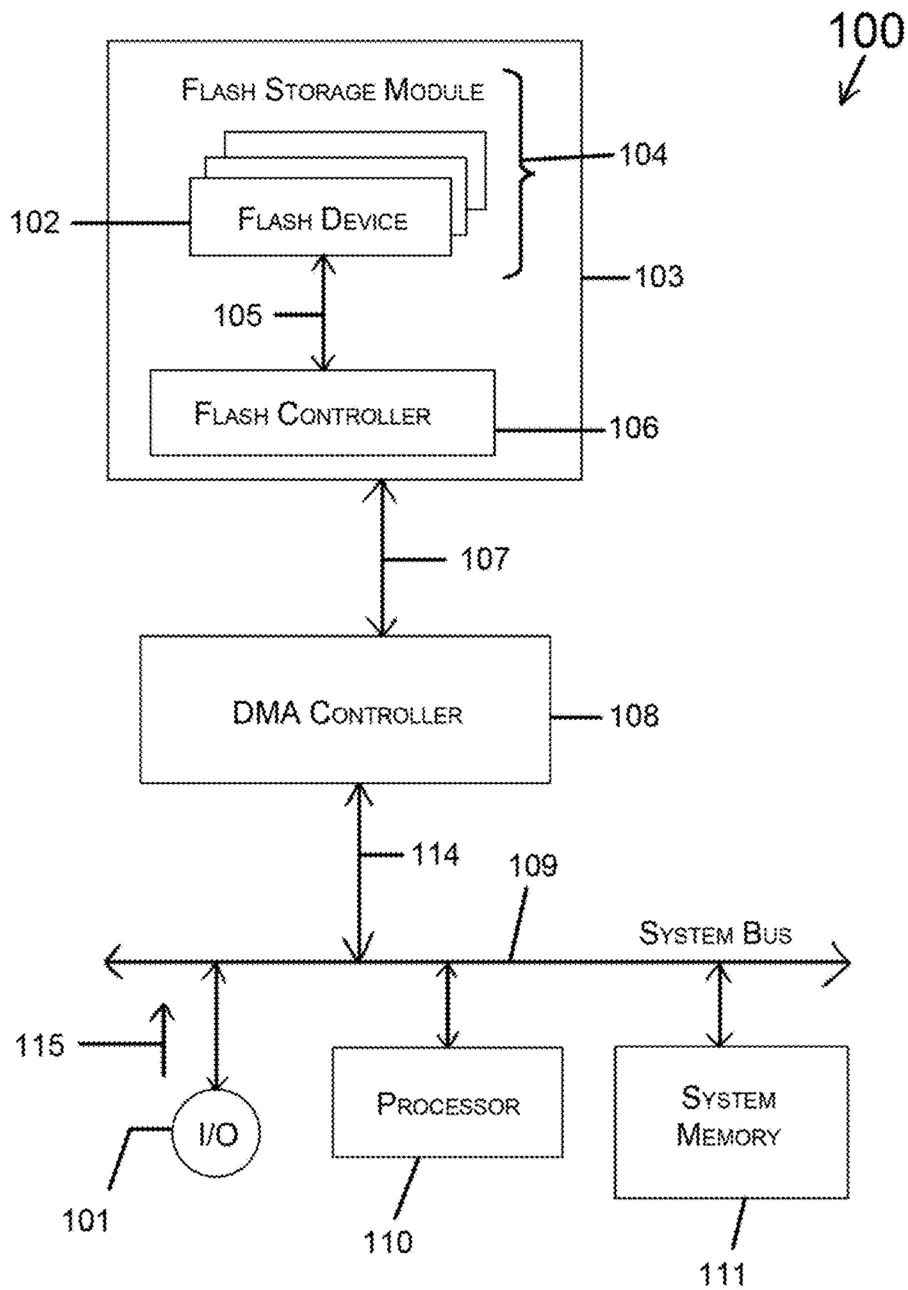
FIG. 1 is a block diagram of an example data storage system (or data storage apparatus) that can include an embodiment of the invention.

FIG. 1 is a block diagram of an example data storage system 100 (or data storage apparatus 100) that can include an embodiment of the invention. Those skilled in the art with the benefit of this disclosure will realize that an embodiment of the invention can be included in other suitable types of computing systems or data storage systems.

When the system 100 has initialized and is under normal operation, an input-output (I/O) device 101, for example, will do a read transaction to read data from one or more non-volatile memory devices 102 in the flash storage module 103 or do a write transaction to write data to one or more non-volatile memory devices 102 in the flash storage module 103. Typically, the one or more memory devices 102 form a memory device array 104 in the flash module 103. The memory device array 104 is coupled via a flash interface 105 to a flash memory controller 106.

The flash storage module 103 is coupled via a flash bus 107 (or memory bus 107) to a Direct Memory Access (DMA) controller 108. The DMA controller 108 is coupled via a DMA bus interface 114 to a system bus 109.

A processor 110, system memory 111, and input/output device 101 are all coupled to the system bus 109. The system 100 can include more than one I/O device 101, more than one processor 110, and/or more than one system memory 111. Additionally or alternatively, the system 100 can include more than one DMA controller 108 and more than one flash storage module 103. In an embodiment of the invention that includes a plurality of flash storage modules 103 and a plurality of DMA controllers 108, wherein each flash storage module 103 is coupled via a respective flash bus 107 to a respective DMA controller 108, the plurality of flash storage modules 103 will form an array (not shown) of flash storage modules 103.

System bus 109 is a conduit or data path for transferring data between DMA controller 108, processor 110, system memory 111, and I/O device 101. Processor 110, DMA controller 108, and I/O device(s) 101 may access system memory 111 via system bus 109 as needed. System memory 111 may be implemented using any form of memory, such as, for example, various types of DRAM (dynamic random access memory), non-volatile memory, or other types of memory devices.

A request 115 for a memory transaction (e.g., read or write transaction) from an I/O device 101, typically in the form of an input-output descriptor command, is destined for the processor 110. Descriptor commands are detailed instructions to be executed by an engine or a module. The processor 110 interprets that the input-output descriptor command intends to read from memory devices 102 in the flash storage module 103 or intends to write to memory devices 102 in the flash storage module 103. The processor 110 is in-charge of issuing all the needed descriptors to one or more Direct Memory Access (DMA) controllers 108 to execute a read memory transaction or write memory transaction in response to the request 115. Therefore, the DMA controller 108, flash memory controller 106, and processor 110 allow at least one device, such as I/O device 101, to communicate with memory devices 102 within the data storage apparatus 100. Operating under a program control (such as a control by software or firmware), the processor 110 analyzes and responds to a memory transaction request 115 by generating DMA instructions that will cause the DMA controller 108 to read data from or write data to the flash devices 102 in a flash storage module 103 through the flash memory controller 106. If this data is available, the flash memory controller 106 retrieves this data, which is transferred to system memory 111 by the DMA controller 108, and eventually transferred to I/O device 101 via system bus 109. Data obtained during this memory read transaction request is hereinafter named "read data". Similarly, write data from the I/O device 110 will cause the DMA controller 108 to write data to the flash devices 102 through the flash memory controller 106.

A non-volatile memory device 102 in the flash storage module 103 may be, for example, a flash device. This flash device may be implemented by using a flash memory device that complies with the Open NAND Flash Interface Specification, commonly referred to as ONFI Specification. The term "ONFI Specification" is a known device interface standard created by a consortium of technology companies known as the "ONFI Workgroup". The ONFI Workgroup develops open standards for NAND Flash memory devices and for devices that communicate with these NAND flash memory devices. The ONFI Workgroup is headquartered in Hillsboro, Oreg. Using a flash device that complies with the ONFI Specification is not intended to limit the embodiment(s) disclosed herein. One of ordinary skill in the art having the benefit of this disclosure would readily recognize that other types of flash devices employing different device interface protocols may be used, such as protocols that are compatible with the standards created through the Non-Volatile Memory Host Controller Interface (NVMHCI) working group. Members of the NVMHCI working group include Intel Corporation of Santa Clara, Calif., Dell Inc. of Round Rock, Tex., and Microsoft Corporation of Redmond, Wash.

Those skilled in the art with the benefit of this disclosure will realize that there can be multiple components in the system 100 such as, for example, multiple processors, multiple memory arrays, multiple DMA controllers, and/or multiple flash controllers.

Figure 2:
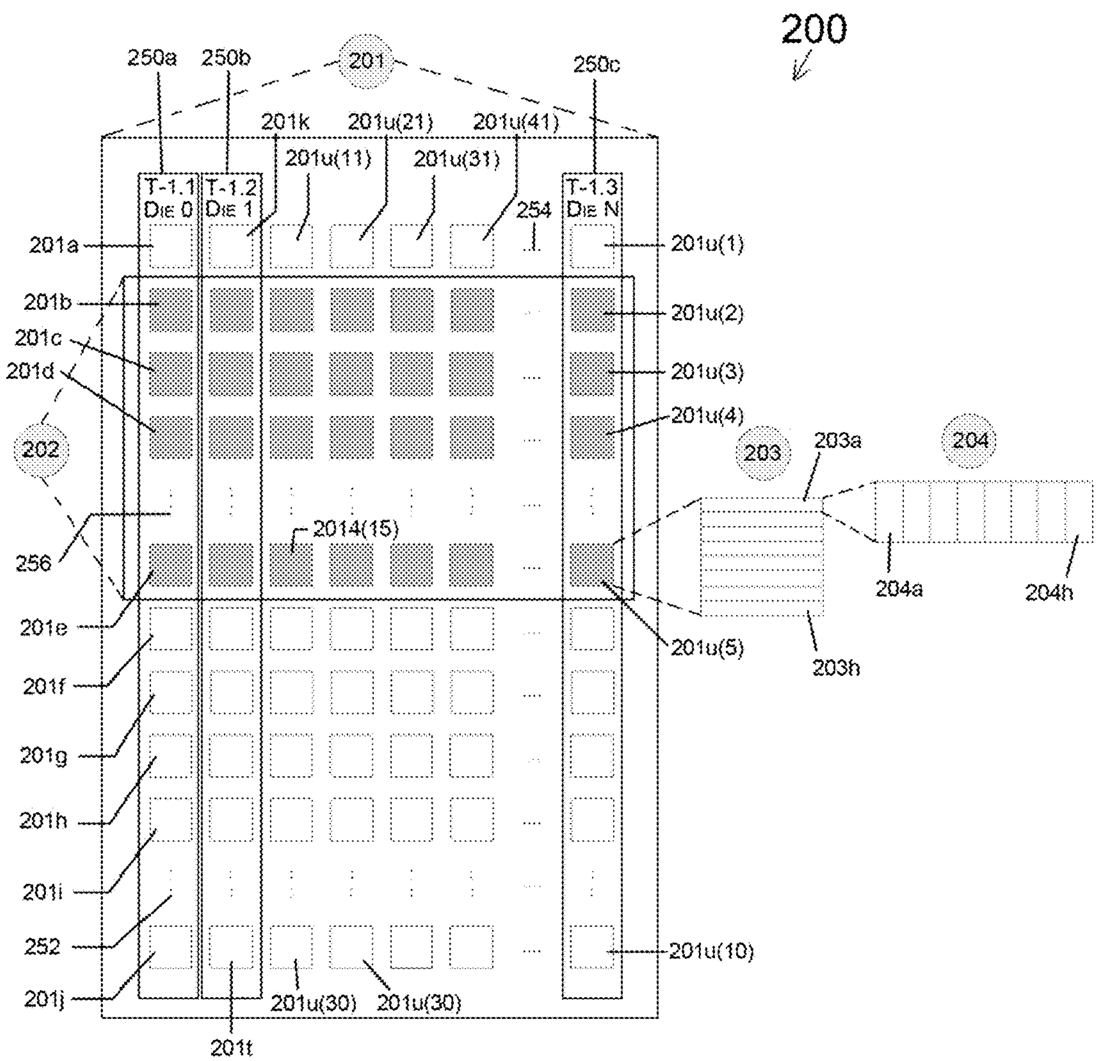
FIG. 2 is block diagram of a structure of a NAND flash system per FBX, in accordance with an embodiment of the invention.

FIG. 2 is block diagram showing a structure 200 (or system 200) of a NAND Flash System per FBX, in accordance with an embodiment of the invention. As known to those skilled in the art, FBX is a Flash Box which is similar to a Disk Chassis.

Box (or boundary) 201 shows a plurality of flash blocks arranged according to flash dies. The box 201 can be one of the flash memory devices 102 that are shown in the example data storage system 100 of FIG. 1. For example, flash blocks 201*a* through 201*j* are included in a flash die 250*a*. Similarly, flash blocks 201*k* through 201*t* are included in a flash die 250*b*. The flash blocks 201*u*(1) through 201*u*(10) are in a flash die 250*c*. The flash blocks in a flash die can vary in number. For example, the flash blocks in the flash die 250 can vary in number as noted by, for example, the dots symbols 252. The flash dies in the FBX structure 200 can vary in number as noted by, for example, the dot symbols 254. For example, there can more flash dies in the FBX structure 200 in addition to the flash dies 250*a*, 250*b*, and 250*c*. Alternatively, there can be less flash dies in the FBX structure 200 than the flash dies 250*a*, 250*b*, and 250*c*.

Box (or boundary 202) shows which portion within the flash memory 201 from which the control data will be flushed. In the example of FIG. 1, control data will be flushed from all flash blocks that are included within box 202 such as, for example, flash blocks 201*b* through 201*e*, 201*u*(2) through 201*u*(5), 201*u*(12) through 201*u*(15), 201*u*(22) through 201*u*(25), 201*u*(32) through 201*u*(35), and 201*u*(42) through 201*u*(45). The flash blocks that will have control data to be flushed in the box 202 may vary in number as noted by, for example, the dot symbols 254 and dot symbols 256.

Each flash block is subdivided into flash pages. For example, the flash block 201*u*(5) in box 202 is subdivided into flash pages 203. The flash pages in a flash block may vary in number. For example, the flash block 210*u*(5) is subdivided into flash pages 203*a* through 203*h*. In typical implementations, a flash block is subdivided into more flash pages in addition to the flash pages 203*a* through 203*h*.

Each flash page is subdivided into segments. For example, the flash page 203 in flash block 201*u*(5) is subdivided into flash segments 204. The segments in a flash page may vary in number. For example, the flash page 203 is subdivided into segments 204*a* through 204*h*. In typical implementations, a flash page is subdivided into more segments in addition to the segments 204*a* through 204*h*.

Figure 3:
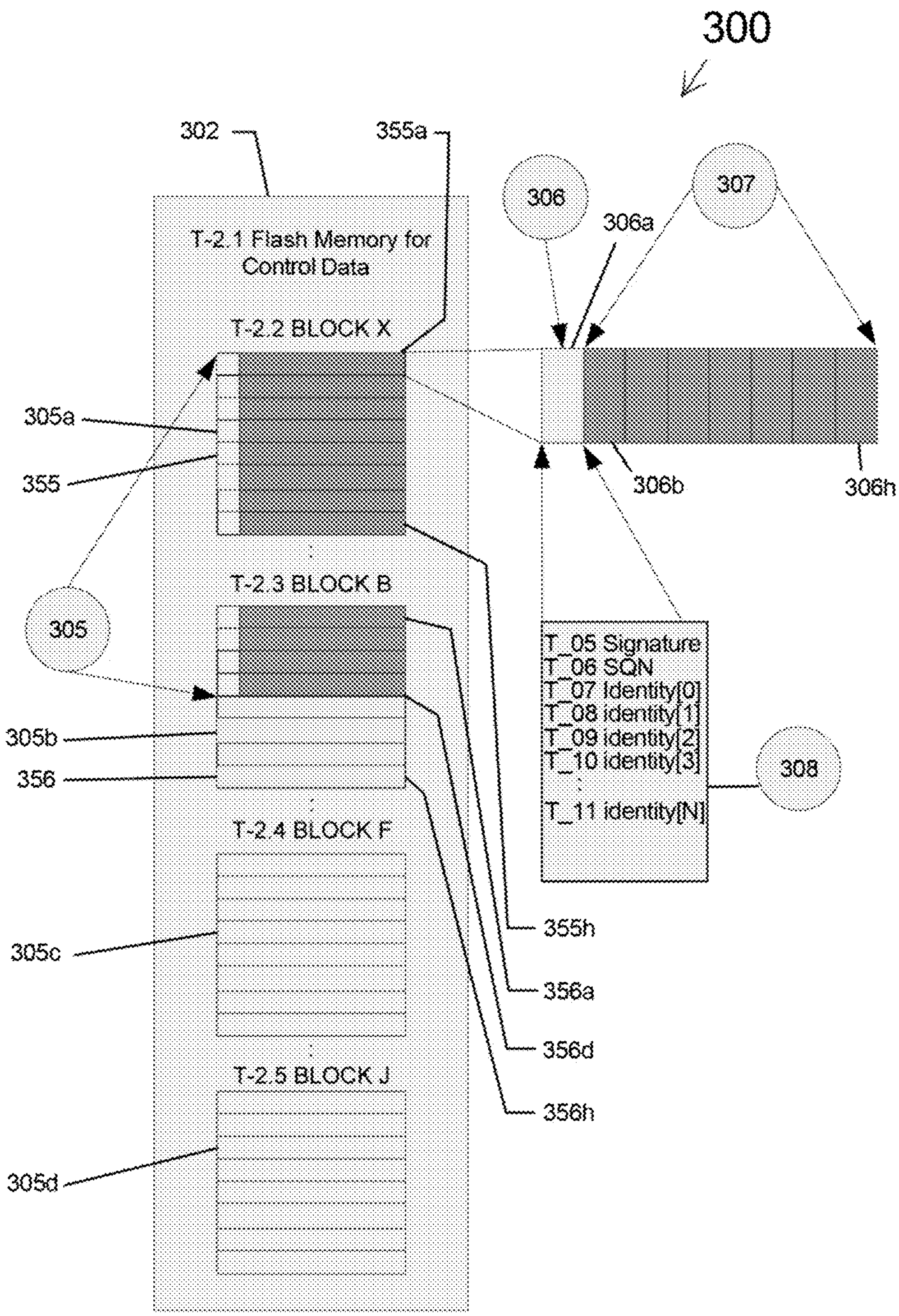
FIG. 3 is a block diagram of a structure of a flash page with control data written to the flash page, in accordance with an embodiment of the invention.

FIG. 3 is a block diagram of a structure 300 of a flash page with control data written to the flash page, in accordance with an embodiment of the invention. Box (T-2.1) 302 includes arbitrary flash blocks 305 for control data flushing. Flash blocks 105 include flash pages with valid control data flushed on the flash pages. For example, these arbitrary flash blocks comprises a flash block (T-2.2 Block X) 305*a* is a block that contains valid control data and a flash block (T-2.3 Block B) 305*b* is a block that partially contains valid control data. Flash block (T-2.4 Block F) 305*c* and flash block (T-2.5 Block J) 305*d* are flash blocks that are erased or do not contain valid control data.

Flash block 305*a* includes flash pages 355. For example, flash block 305*a* includes flash pages 355*a* through 355*h*, wherein valid control data is flushed on or written to each of the flash pages 355*a*-355*h*.

Flash block 305*b* includes flash pages 356. For example, flash block 305*b* includes flash pages 356*a* through 356*h*, wherein valid control data is flushed on or written to each of the flash pages 356*a*-356*d* and wherein the flash pages 356*e* through 356*h* are erased or do not contain valid control data.

Flash page 355*a* includes a plurality of segments 306. First segment 306*a* of flash page 355*a* contains control data identifier information that identifies the flash page 355*a* as containing a control data and information concerning the succeeding segments 306*b* through 306*h* of the flash page 355*a*. Segments 306*b* through 306*h* are segments within a flash page (flash page 355*a* in this example) wherein each of these segments 306*b*-306*h* contains control data.

Block 308 shows the information found in the first segment 306*a*. This information 308 comprises the signature (T_05) which identifies the flash page 355*a* as a control data page, the sequence number SQN (T_06) that is used to track control data updates, and the array of identities (T_07 through T_11) which describes the control data written from segments (1) 306*b* up to the last segment 306*h* of the flash page 355*a*. Since the segments 306 in a flash page 355*a* can vary in number, the identities in the array T_07 through T_11 can vary in number as noted by, for example, the dot symbols 358.

Reference is now made to FIGS. 4 through 10 which disclose a process of writing a control data with the collection of a modified cache line using a combination technique. The process performed in FIGS. 4 through 10 may be executed by, for example, the DMA controller 108 through the flash memory controller 106 which accesses the flash memory device 102. Therefore, a control data flushing system 200 in an embodiment of the invention can include the DMA controller 108, flash memory controller 106, and as storage device 102 which may be, for example, a flash memory device 102 or a solid state drive (SSD) 102.

Figure 4:
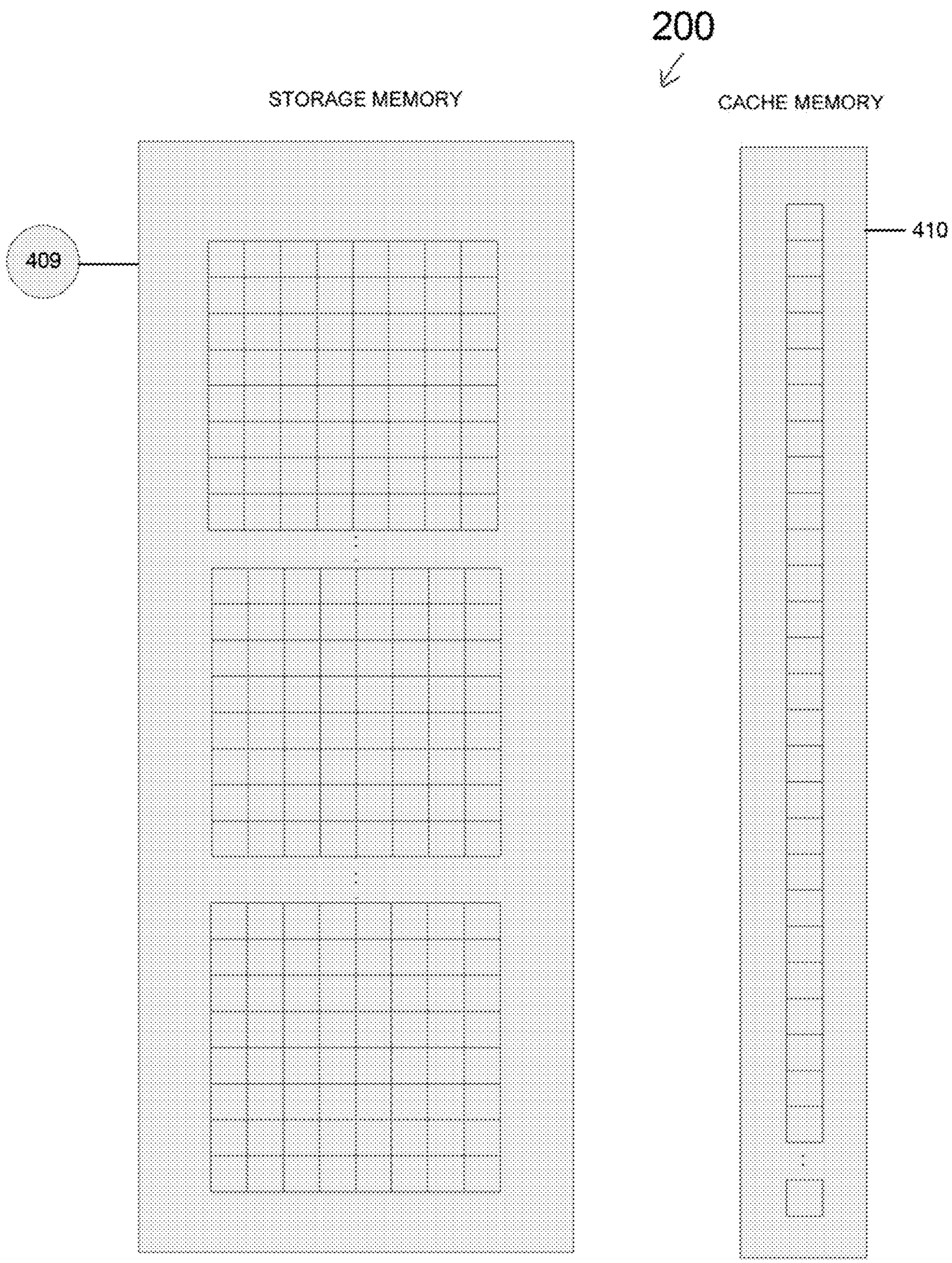
FIG. 4 is a block diagram illustrating an initial state of a storage memory and a cache memory, wherein both memory areas in the storage memory and cache memory contain no data, in accordance with an embodiment of the invention.

FIG. 4 is a block diagram illustrating an initial state of a storage memory 409 and a cache memory 410, wherein both memory areas in the storage memory 410 and cache memory 410 contain no data, in accordance with an embodiment of the invention. As an example, the storage memory 409 is one or more of the flash memory devices 102 (FIG. 1) and the cache memory 410 can be a memory area in one of the flash devices 102, a memory area in the flash controller 106, or a memory area in another part of the flash storage module 103 (FIG. 1).

The Cache memory 410 is divided into a segment size, which is the same size as a flash segment (e.g., flash segment 204). The initial state of both memory areas 409 and 410 contains no data in FIG. 4, until the system 200 undergoes a constructing process. The size of the storage memory 409 and/or size of the cache memory 410 can be set to other suitable sizes.

Figure 5:
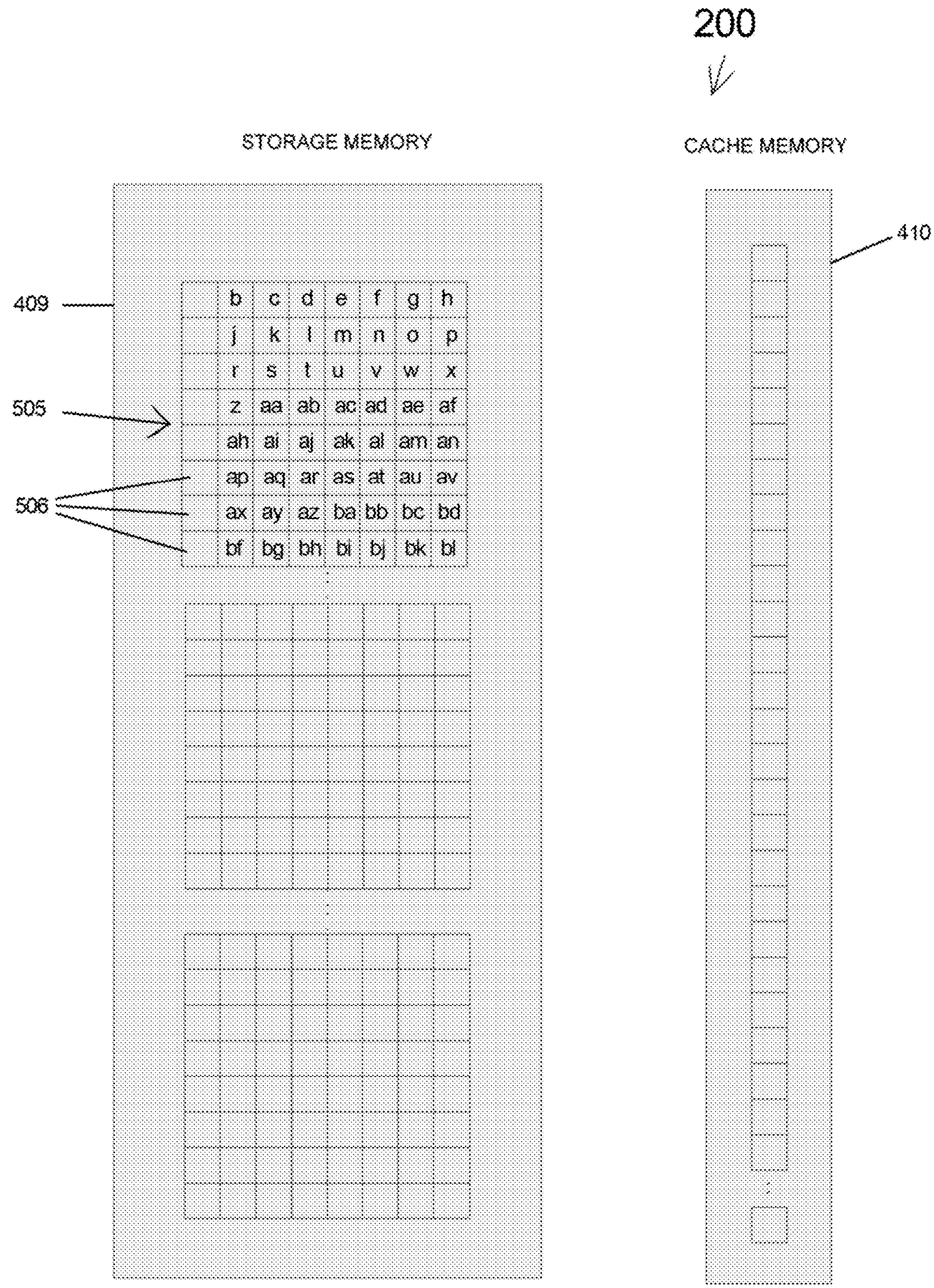
FIG. 5 is a block diagram illustrating a subsequent state of the storage memory, wherein the storage memory contains control data, in accordance with an embodiment of the invention.

FIG. 5 is a block diagram illustrating a subsequent state of the storage memory 409, wherein the storage memory 409 contains control data (generally shown as control data 505) in a plurality of flash blocks 506 in the storage memory 409, in accordance with an embodiment of the invention. The control data (or metadata) can be scattered in the storage memory 409 and would be in a volatile stored form in the cache memory 410.

Figure 6:
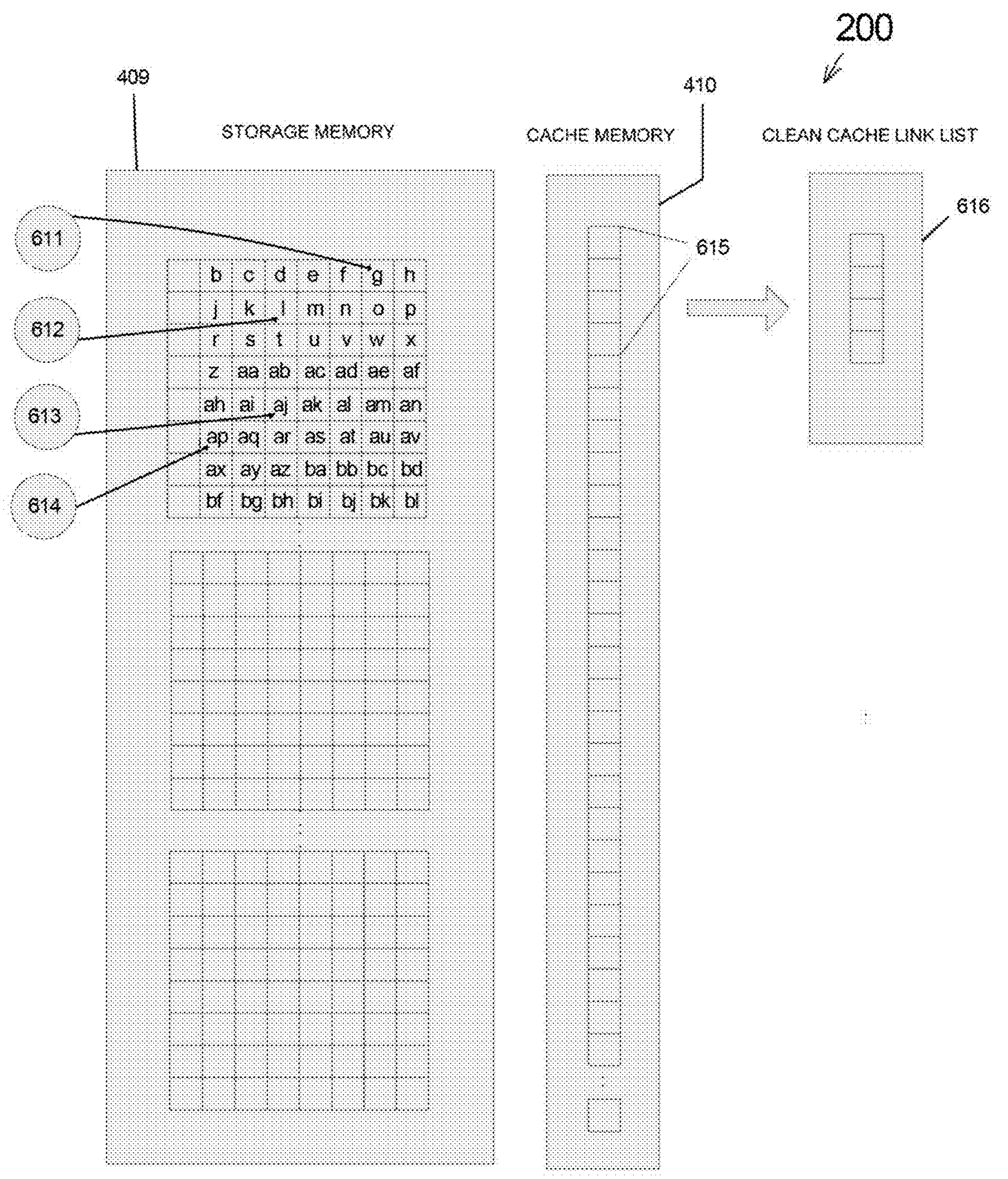
FIG. 6 is a block diagram illustrating a subsequent state of the storage memory, wherein updates or modification request on control data are performed, in accordance with an embodiment of the invention.

FIG. 6 is a block diagram illustrating a subsequent state of the storage memory 409, wherein updates or modification request on control data are performed, in accordance with an embodiment of the invention. Updates or modifications requests are performed on the control data 611, 612, 613, and 614 in the storage memory 409. The system 200 will ask for a vacant cache memory area 615 in the cache memory 410, and the next block is identified as a Clean Cache Link List 616 in the cache memory 410.

Figure 7:
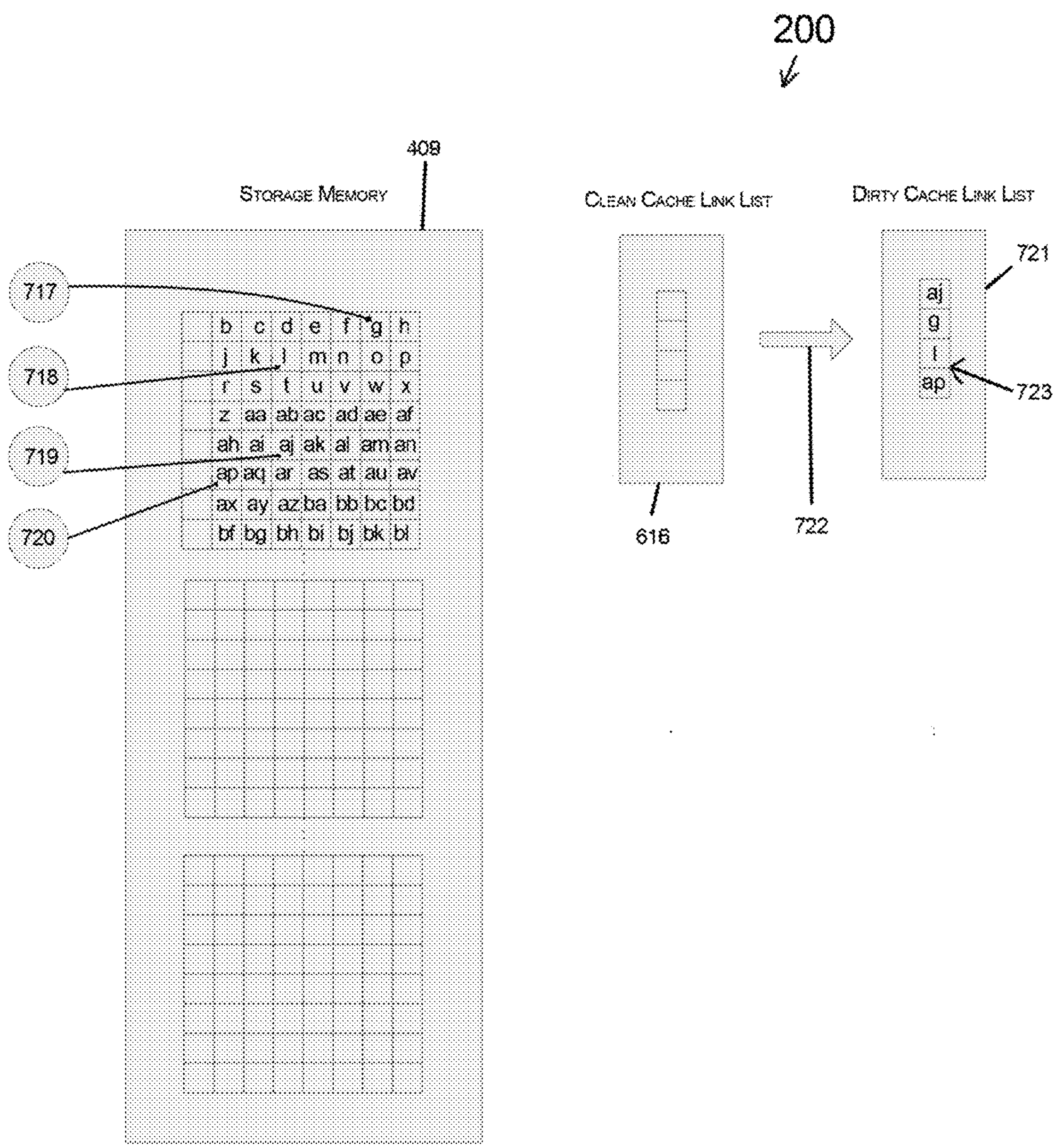
FIG. 7 is a block diagram illustrating a subsequent state of the storage memory and cache memory, wherein the control data is replicated from the storage memory to the cache memory, in accordance with an embodiment of the invention.

FIG. 7 is a block diagram illustrating a subsequent state of the storage memory 409 and cache memory 410, wherein the control data is replicated from the storage memory to the cache memory, in accordance with an embodiment of the invention. Control data 717, 718, 719, and 720 (also shown as control data 611, 612, 613, and 614 in FIG. 6, respectively) is replicated from storage memory 409 to cache memory 410. As an example, control data 717, 718, 719, and 720 are symbolically represented as, “g”, “l”, “aj”, and “ap”. The Cache memory 410 holds the target data (control data that is modified) in this operation. The previous clean cache link list 616 is moved (722) to the dirty cache link list 721 so that the dirty cache link list 721 is partially changed by moving (722) the previous clean cache link list 616 to the dirty cache link list 721. Therefore, the dirty cache link list 721 in the cache memory 410 will first contain the example control data sets 723 that are symbolically represented as “aj”, “g”, “l”, and “ap”, and when the control data 717-720 are updated or modified, the previous clean link list 616 is moved (722) to the dirty cache link list 721 so that the dirty cache link list 721 is changed into the updated control data 823 of FIG. 8. Therefore, the cache memory 410 is used to update or modify the control data.

Figure 8:
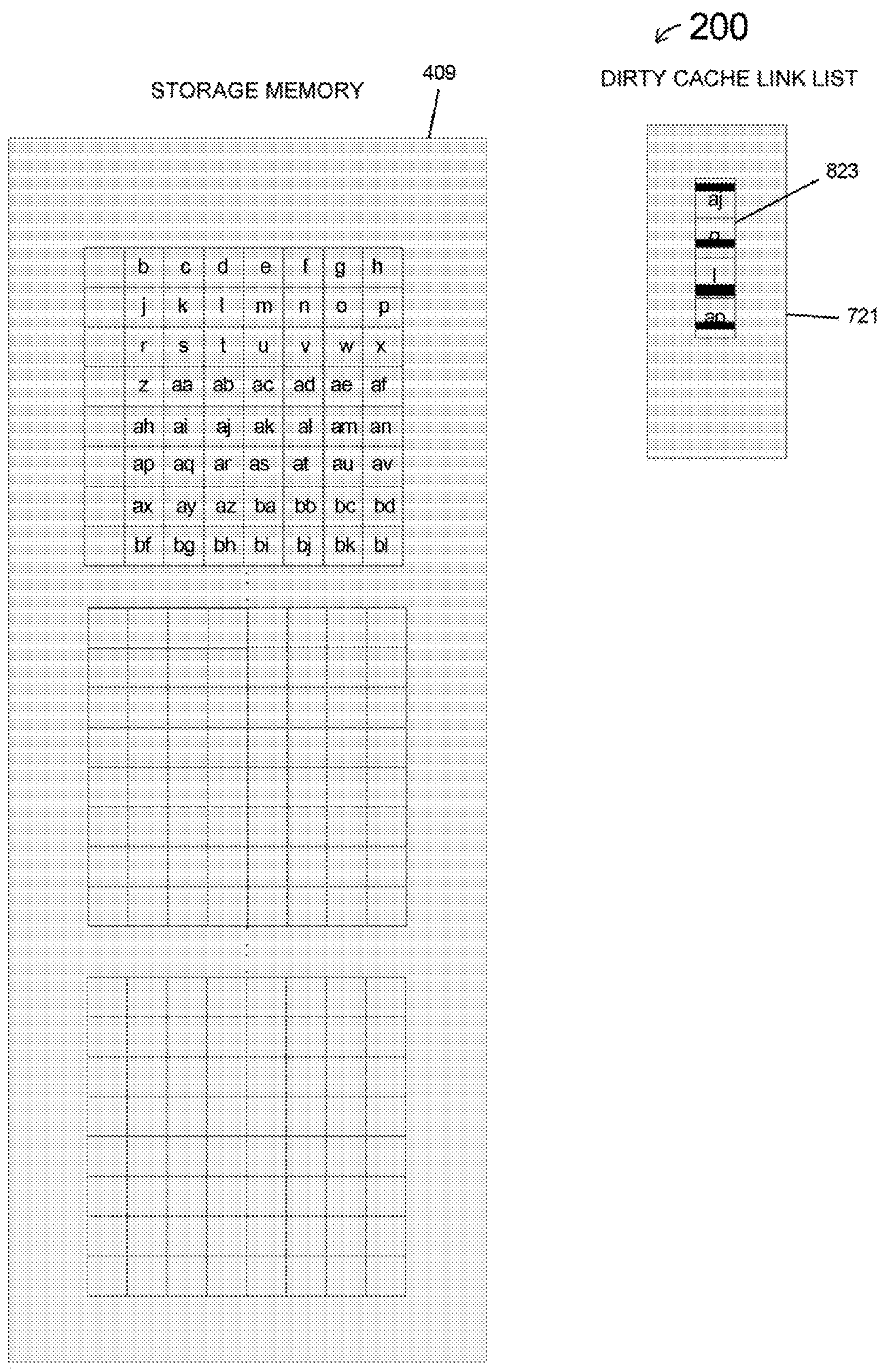
FIG. 8 is a block diagram illustrating a subsequent state of the storage memory and cache memory, wherein the control data is partially changed in the cache memory, in accordance with an embodiment of the invention.

FIG. 8 is a block diagram illustrating a subsequent state of the storage memory 409 and cache memory 410, wherein the control data 823 is partially changed in the cache memory 409, in accordance with an embodiment of the invention. As discussed above, the control data 823 (in the dirty cache link list 721) has been partially changed after moving (722) the clean cache link list 616 in the cache memory 410 to the dirty cache link list 721.

Figure 9:
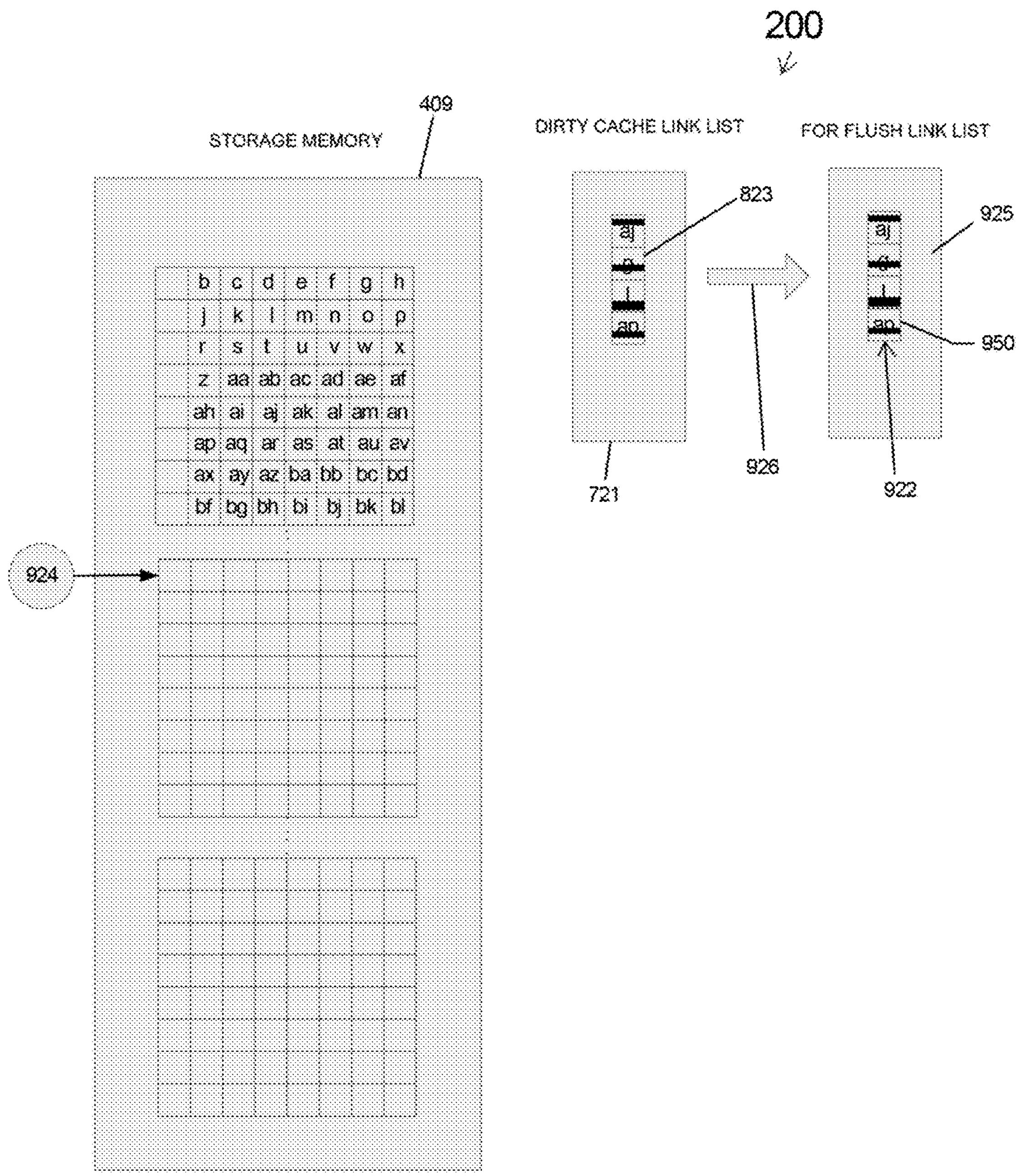
FIG. 9 is a block diagram illustrating a subsequent state of the storage memory and cache memory, wherein the dirty cache link list is moved to the for flush link list in the cache memory, in accordance with an embodiment of the invention.

FIG. 9 is a block diagram illustrating a subsequent state of the storage memory 409 and cache memory 410, wherein the dirty cache link list 721 is moved (926) to the for flush link list 925 in the cache memory 410, in accordance with an embodiment of the invention. Therefore, the cache line 922 in the for flush link list 925 (in cache memory 410) will contain the updated control data 950. Once the cache line 922 (which has the updated control data 950 is ready to be written into the storage memory 409, the dirty cache link list 721 will be moved (926) to the flush link list 725. The control data flushing system 200 will ask for a free page 924 in storage memory 409 in order to write the updated control data 950 in cache memory 410 from the for flush link list 925.

Figure 10:
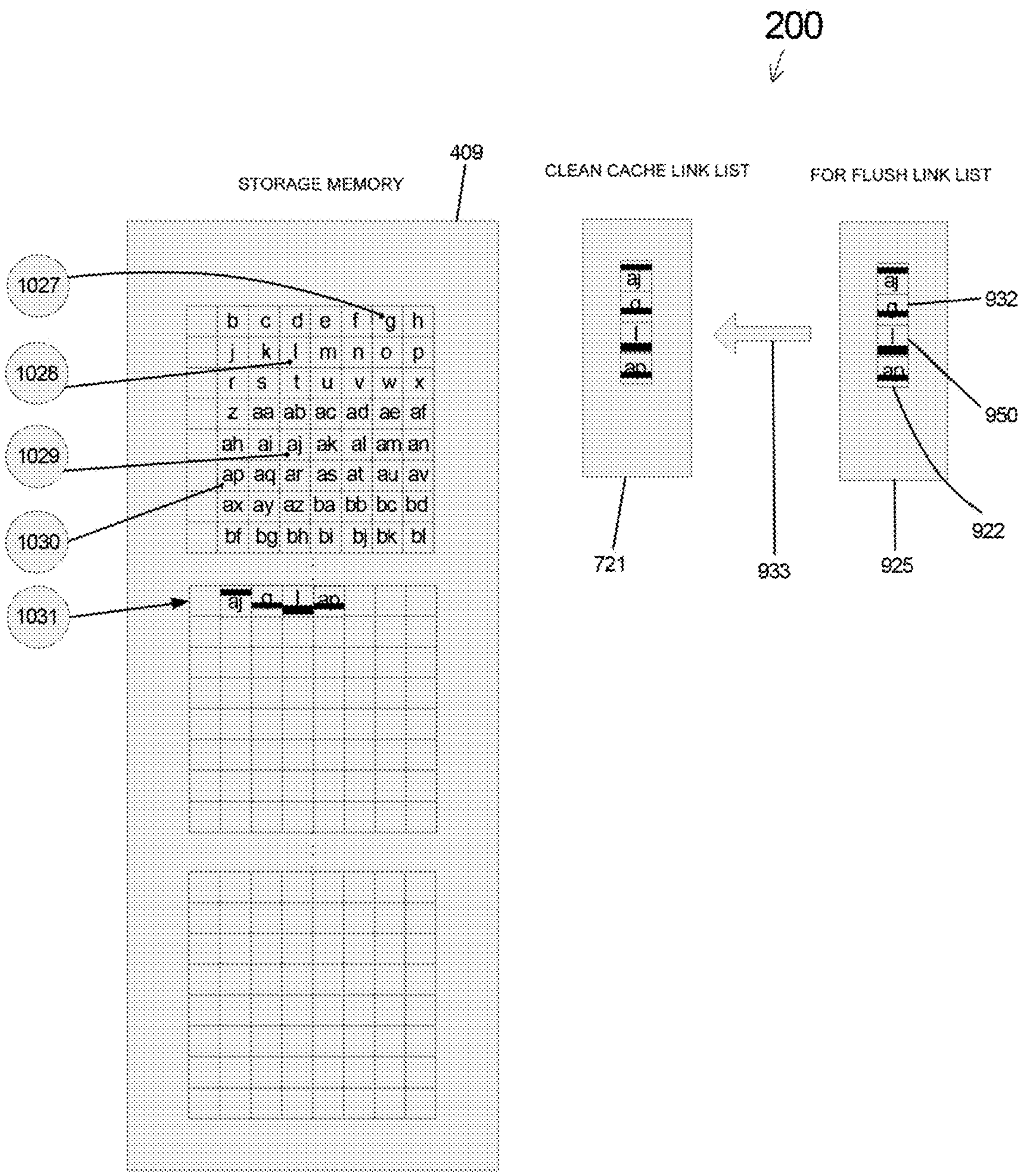
FIG. 10 is a block diagram illustrating a subsequent state of the storage memory and cache memory, wherein the updated control data is now written to the storage memory, in accordance with an embodiment of the invention.

FIG. 10 is a block diagram illustrating a subsequent state of the storage memory 409 and cache memory 410, wherein the updated control data 950 is now written to the storage memory 409, in accordance with an embodiment of the invention. Control data 1027, 1028, 1029, and 1030 are the old control data that was previously modified, and the updated control data 950 are written to the new flash page 1031 in the storage memory 409. The used cache line 922 retains its control data 932 (which is also the updated control data 950 of FIG. 9) and the system 200 returns (933) to the for flush link list 925 to the clean cache memory link list 721.

An embodiment of the invention advantageously avoids the need to save the next level pointer because in this method embodiment (or algorithm) of the invention, an indicator/header representing each page is provided. During power-on and/or boot-up, the algorithm searches every page in the system so that the method determines what is represented in each header. The system performance in run-time will be faster because the algorithm does not need to update the high level pointer. In contrast with regard to a previous approach, during run-time, there is a domino effect wherein if a directory zero section is saved, the directory DIR1 (which is a pointer to the directory zero section) will also need to be updated and the DIR1 section will need to be saved because of the update to DIR1. In an algorithm in an embodiment of the invention, at I/O (input/output) time, after the directory zero section is saved, there is no need to update the DIR1 entry. The algorithm reads a small segment of each flash page where the control header is stored and thus the algorithm identifies the content of each flash page. During boot-up, the algorithm reads the control header (block 306) and during boot-up, the algorithm compares the sequence numbers and the higher sequence number is updated control data version and thus the newest directory section will have a higher SQN number. An algorithm in one embodiment of the invention advantageously avoids the logging (journaling) of a saved directory section.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

requesting an update or modification on a control data in at least one flash block in a storage memory;

requesting a cache memory;

replicating, from the storage memory to the cache memory, the control data to be updated or to be modified;

changing a dirty cache link list to reflect the update or modification on the control data; and moving the dirty cache link list to a for flush link list and writing an updated control data from the for flush link list to a free flash page in the storage memory.

2. The method of claim 1, wherein the cache memory is used as a temporary location for modifying the control data.

3. The method of claim 1, wherein the at least one flash block comprises at least one flash page and wherein the at least one flash page comprises a control data identifier information and control data information.

4. The method of claim 1, further comprising: returning the for flush link list to a clean cache link list in the cache memory.

5. The method of claim 1, wherein the dirty cache link list is moved to the for flush link list prior to writing the updated control data to the storage memory.

6. The method of claim 1, wherein the storage memory comprises at least one solid state drive (SSD).

7. The method of claim 1, wherein the storage memory comprises at least one flash memory device.

8. The method of claim 1, wherein the control data is scattered in the storage memory.

9. An apparatus, comprising:

a control data flushing system configured to:

request an update or modification on a control data in at least one flash block in a storage memory;

request a cache memory;

replicate, from the storage memory to the cache memory, the control data to be updated or to be modified;

change a dirty cache link list to reflect the update or modification on the control data; and move the dirty cache link list to a for flush link list and write an updated control data from the for flush link list to a free flash page in the storage memory.

10. The apparatus of claim 9, wherein the cache memory is used as a temporary location for modifying the control data.

11. The apparatus of claim 9, wherein the at least one flash block comprises at least one flash page and wherein the at least one flash page comprises a control data identifier information and control data information.

12. The apparatus of claim 9, wherein the control data flushing system is configured to return the for flush link list to a clean cache link list in the cache memory.

13. The apparatus of claim 9, wherein the dirty cache link list is moved to the for flush link list prior to writing the updated control data to the storage memory.

14. The apparatus of claim 9, wherein the storage memory comprises at least one solid state drive (SSD).

15. The apparatus of claim 9, wherein the storage memory comprises at least one flash memory device.

16. The apparatus of claim 9, wherein the control data is scattered in the storage memory.

17. An article of manufacture, comprising:

a non-transitory computer-readable medium having stored thereon instructions operable to permit an apparatus to perform a method comprising:

requesting an update or modification on a control data in at least one flash block in a storage memory;

requesting a cache memory;

replicating, from the storage memory to the cache memory, the control data to be updated or to be modified;

changing a dirty cache link list to reflect the update or modification on the control data; and moving the dirty cache link list to a for flush link list and writing an updated control data from the for flush link list to a free flash page in the storage memory.

18. The article of manufacture of claim 17, wherein the method further comprises: returning the for flush link list to a clean cache link list in the cache memory.

19. The article of manufacture of claim 17, wherein the dirty cache link list is moved to the for flush link list prior to writing the updated control data to the storage memory.

20. The article of manufacture of claim 17, wherein the control data is scattered in the storage memory.

21. The article of manufacture of claim 17, wherein the cache memory is used as a temporary location for modifying the control data.

22. The article of manufacture of claim 17, wherein the at least one flash block comprises at least one flash page and wherein the at least one flash page comprises a control data identifier information and control data information.

23. The article of manufacture of claim 17, wherein the storage memory comprises at least one solid state drive (SSD).

24. The article of manufacture of claim 17, wherein the storage memory comprises at least one flash memory device.

* * * * *